Figure 1:
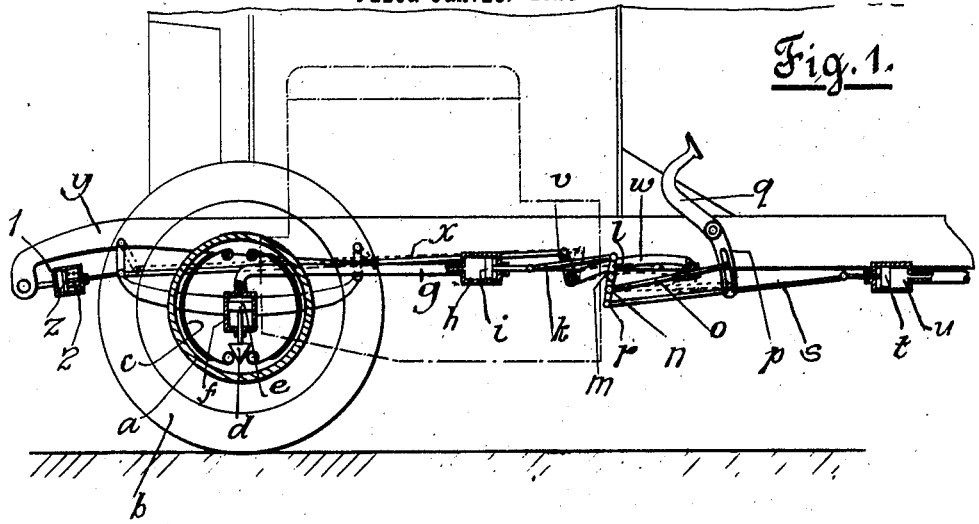

Oct. 11, 1927.

F. PORSCHE

FLUID PRESSURE BRAKE FOR POWER DRIVEN ROAD VEHICLES

Filed Jan. 16, 1926

1,645,400

Patented Oct. 11, 1927.

1,645,400

UNITED STATES PATENT OFFICE.

FERDINAND PORSCHE, OF STUTTGART-UNTERTURKHEIM, GERMANY, ASSIGNOR, BY MESNE ASSIGNMENTS, TO DAIMLER-BENZ AKTIENGESELLSCHAFT, OF BERLIN, GERMANY.

FLUID-PRESSURE BRAKE FOR POWER-DRIVEN ROAD VEHICLES.

Application filed January 16, 1926, Serial No. 81,824, and in Austria August 8, 1923.

This invention comprises improvements in and connected with brake mechanisms for vehicles and particularly motor road vehicles. In order to simplify these mechanisms and to avoid rod and link transmissions, it has already been proposed to adopt hydraulic and pneumatic transmissions for the brakes of motor road vehicles, and such proposals have been made more particularly in connection with four wheel braking. In spite of the advantages to be obtained with brake mechanisms of this description, they have been found to be far from perfect, mainly owing to the fact that there is no absolute guarantee that the wheels cannot become locked by excessive brake pressure. As is well-known, the locking of the wheels, and especially the front wheels, of a motor road vehicle is liable to have serious consequences and may result in accidents due to the skidding or overturning of the vehicle.

The locking of the wheels by any brakes may be due to want of skill or attention on the part of the driver who may inadvertently make a too sudden application of the brakes. However, it is not due to this alone as the danger of locking is inherent to the mechanical construction and method of operation. Locking of wheels always takes place when the braking moment and the adhesion of the wheels on the ground are equal. The coefficient of friction between the brake drum and the brake shoes or device increases to a substantial extent with decrease of speed whereas the coefficient of friction between the road surface and the tyres changes only to a very slight extent with change in speed. Consequently the great pressure applied at the beginning of a braking operation must be reduced as the speed decreases if locking of the wheels is to be avoided. Ordinary brake mechanisms, however, operate just in the reverse sense and, owing to this characteristic, it is very difficult for the driver even with the exercise of great care, to avoid locking the wheels.

Apart from the danger of locking the wheels explained above there is the further danger that one or other of the wheels may become locked owing, for example, to a change in the condition of the individual friction surfaces whereby the braking action on one wheel might be greater than on another and sufficient for causing that wheel to lock. In such cases, the driver is powerless to do anything to prevent locking from occurring.

The principal object of the present invention is to devise hydraulic and pneumatic brake installations adapted for meeting all requirements and for ensuring, in a reliable manner, the avoidance of wheel-locking, either as regards individual wheels or all the wheels of a vehicle.

According to this invention, relative movement taking place between parts of the vehicle, and due to the braking action being opposed to momentum, is caused to influence the brake mechanism in such a manner as to reduce the braking action at the instant when it may reach the value at which locking of the wheels may take place. The reduction of brake pressure brought about in this manner precludes locking of the wheels in all circumstances. The forces of momentum will always become active for producing the said relative motion when opposed to the forces due to the resistance offered by ground contact, no matter what may be the condition of the road or the speed of the vehicle, so that the locking of wheels by the brakes is reliably avoided in a perfectly automatic manner.

In carrying out the invention, a spring or equivalent device is introduced between braked and non-braked vehicle parts and an adjustment is provided for enabling the resistance of the spring or equivalent device to be altered as desired. By this means, the damping counteraction due to the spring or equivalent device can be adjusted to suit road conditions. For example, when the roads are wet and the coefficient of friction between the road surface and the tyres is smaller than in the case of a dry road, the compression or tension of the spring or the resilient counter-action is reduced. Upon applying the brakes at any speed of driving, the brake pressure is automatically reduced in the manner aforesaid when the vehicle speed is reduced to such a point that there may be danger of wheel locking. Upon further retardation, the speed is reduced still further so that there may be again a danger of wheel-locking, whereupon the automatic means again functions for further reducing the braking action. This process may be repeated until the vehicle is brought to a standstill.

The improved automatic regulator can be applied to hydraulic and pneumatic brakes and to all other kinds of brake, either so that it shall act simultaneously on all wheels of the vehicle or so that it shall act independently on individual wheels of the vehicle. The relative action aforesaid may be utilized for altering a leverage or mechanical advantage in the transmission, or it may be utilized for altering a fluid pressure employed in the transmission.

In the accompanying drawing two constructional examples of the invention are shown diagrammatically.

Fig. 1 illustrates a brake operated by hydraulic means.

Figure 2:
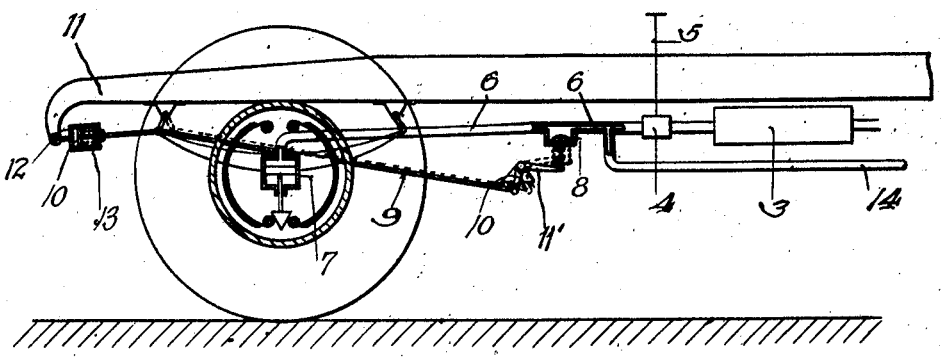

Fig. 2 a brake with means for operating it by compressed air, and

Figure 3:
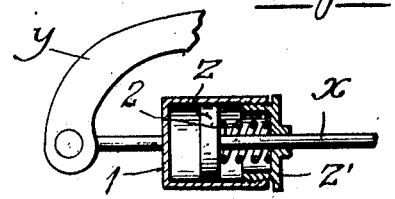

Fig. 3 is a sectional detail of the cylinder on the chassis showing particularly the adjusting means for the spring.

According to Fig. 1 in the brake drum $a$ of the road wheel $b$ brake blocks $c$ are mounted in the ordinary way. The brake blocks are applied by means of a wedge $d$ mounted on a plunger $e$ which is adapted to slide in a cylinder $f$ containing liquid. The cylinder $f$ is in communication with a cylinder $h$ through the pipe $g$. To the piston $i$ of the cylinder $h$ is attached a small rod $k$ which is pivotally connected to one arm $l$ of a double armed lever pivoted at the point $m$. At a point on the other arm of this lever is pivoted a rod $o$, the other end of which engages in the slotted arm $p$ of the foot operated lever $q$. To the end $r$ of the same arm of the double armed lever is pivotally attached a small rod $s$, which acts on a piston $t$ in the liquid cylinder $u$. This latter cylinder may be suitably connected to the brakes of the other pair of road wheels, not shown. The rod $o$ is in engagement with the arm $w$ of a cranked lever $v$, $w$, pivoted at a point rigid with the chassis while to the end of the other arm $v$ a connecting rod $x$ is pivoted. The rod $x$ is preferably constructed in sections which are pivoted to one of the shackles of the front supporting spring. The connection between the front section of the rod $x$ and the frame $y$ consists for instance of a piston $z$ in a cylinder 1 and a spring 2 pressing against the piston. The tension of the spring may be adjusted by the adjustable end plate $z'$ of the cylinder.

The device works as follows:

The pressure exerted by the driver on the foot operated lever $q$ is transmitted through the slotted lever $p$, the rod $o$, the pivoted cranked lever $n$, $m$, $l$, the rod $k$ and the piston $i$ to the liquid in the cylinder $h$. By this means the piston $e$ in the cylinder $f$ is displaced and the wedge $d$ forces the brake blocks against the brake drum. In order that the wheels shall not become locked, the braking pressure is, when necessary, automatically diminished to a suitable extent shortly before such locking would occur, owing to the connection $z$, 1, 2 between the frame and the parts of the vehicle acted on by the brake. Through this connection each time at the moment, in which the road surface resistance of the wheels produced by the braking almost reaches the possible adhesive moment, the non-braked parts of the vehicle, owing to their momentum, will move forward with respect to braked parts of the vehicle, since the road surface resistance acts as a tensile force in opposition to the inertia of the non-braked parts of the vehicle.

For this purpose the spring 2 used in the constructional example shown in the drawing is so adjusted as to give when the maximum permissible tensional force is reached. The rod $n$ and the cranked lever $v$, $w$ will thereby move the rod $o$ for instance out of the position shown in full lines into that shown in dot and dash lines, thus reducing the ratio of transmission between the pedal and the slotted lever $l$, which causes a diminution in the pressure acting in the cylinder $h$. Consequently with the arrangement according to the invention no locking of the wheels can take place. In every case, however, the most effective action of the brake, which takes place just before the locking of the wheels, is brought about independently of the skill of the driver by the automatic regulation of the pressure with which the brakes are applied.

In the constructional example shown in Fig. 2 the brake instead of being operated hydraulically is operated by pneumatic means. In the example shown the arrangement consists of a compressed air reservoir 3 which may be supplied from a compressor, not shown in the drawing. The reservoir is provided with a valve 4 which is adjusted by any suitable means 5. In the pipe 6 connecting the pressure cylinder 7 to the reservoir 3 is a regulating member 8. This member may consist of a blow-off valve which is operated by the sectional rod 9 pivoted to one of the spring shackles and to a cranked lever 10, 11' pivoted in turn to the chassis. At one end of the sectional rod 9 is a piston 10 which slides in a cylinder 12 fixed to the frame 11 and is loaded for instance by a spring 13. To the pipe 6 is connected another pipe 14 which leads to the brakes of the other road wheels of the vehicle, not shown in the drawing.

This arrangement operates in principle similarly to that shown in Fig. 1. In contradistinction to the arrangement shown in Fig. 1 the pressure is not varied by varying the leverages, but by opening and closing the valve 8. This arrangement forms a simplification of that shown in Fig. 1.

The connection of the pneumatic brake with the pressure regulating means described is of particular importance for brakes of this kind, as the operation of pneumatic brakes is almost entirely independent of the feet of the driver. Hence with brakes of this type without the pressure regulation according to the invention the danger of the wheels becoming locked is far greater than is the case with brakes in which the braking pressure is exerted by the driver.

The constructional examples described are only given by way of illustrating the invention and the constructional forms covered by the invention are not limited to those shown in the drawing. The examples shown in the drawing represent the brakes for the front wheels and the connection to the source of energy for the back wheels. The arrangement may, however, be provided only for the front wheels or only for the back wheels.

A point, on which particular stress should be laid, is that the invention enables the braking pressure on each separate wheel to be regulated with certainty and always at the right time. This is only made possible by the road surface resistance being utilized for the regulation. With the known types of brakes the driver, even by exercising the greatest attention, cannot prevent for instance one wheel becoming locked owing to unequal tensional forces.

I claim:

1. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to cooperate with the non-braked elements and the braked elements so as to be actuable by said displacement for limiting the braking pressure.

2. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to cooperate with the non-braked elements and the braked elements so as to be actuable by said displacement for limiting the braking pressure of the brakes of the road wheels of one axle.

3. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to cooperate with the non-braked elements and the braked elements so as to be actuable by said displacement for limiting the braking pressure of the brakes of all the road wheels.

4. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to cooperate with the non-braked elements and the braked elements so as to be actuable by said displacement for limiting the braking pressure and means for opposing a yielding resistance to the displacement of the non-braked elements with respect to the braked elements.

5. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to cooperate with the non-braked elements and the braked elements so as to be actuable by said displacement for limiting the braking pressure and adjustable means for opposing a yielding resistance to the displacement of the non-braked elements with respect to the braked elements.

6. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to co-operate with the non-braked elements and the braked elements so as to be actuable by said displacement for limiting the braking pressure and a buffer spring for opposing a yielding resistance to the displacement of the non-braked elements with respect to the braked elements.

7. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to cooperate with the non-braked elements and the braked elements so as to be actuable by said displacement for limiting the braking pressure and an adjustable buffer spring for opposing a yielding resistance to the displacement of the non-braked elements with respect to the braked elements.

8. In a power driven vehicle, the combination with non-braked elements, braked elements including the road wheels, said non-braked elements being capable of displacement relatively to said braked elements, brakes for the road wheels of the vehicle and mechanism for applying the brakes to the road wheels, said mechanism comprising means for transmitting the braking force by fluid pressure, of means intended to cooperate with the non-braked elements and the braked elements so as to be actuable by said displacement for limiting the braking pressure, an adjustable buffer spring for opposing a yielding resistance to the displacement of the non-braked elements with respect to the braked elements and means controllable by the buffer spring for reducing the leverage of the brake applying mechanism and thereby reducing the braking pressure.

9. In a power driven vehicle, the combination with non-braked elements, braked elements including the road wheels, said non-braked elements being capable of displacement relatively to said braked elements, brakes for the road wheels of the vehicle, a brake applying member, mechanism for applying the brakes to the road wheels, said mechanism comprising means for transmitting the braking force by fluid pressure, a brake rod having a variable point of application interposed between said brake applying member and said brake applying mechanism, an adjustable buffer spring for opposing a yielding resistance to the displacement of the non-braked elements with respect to the braked elements and means connected to said buffer spring for varying the point of application of the brake rod.

In testimony whereof I have signed my name to this specification.

FERDINAND PORSCHE.